Figure 1:
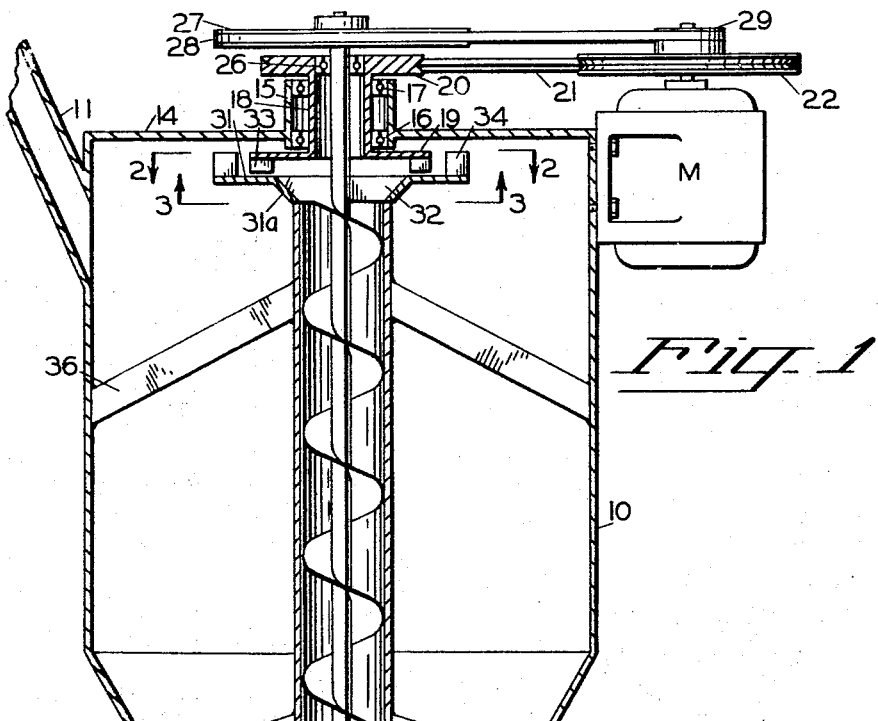

May 9, 1967  J. J. BYBERG  3,318,539

FEED GRINDER

Filed May 3, 1965

INVENTOR.
JONAS J. BYBERG

BY *F. A. Geisler*

ATTORNEY

3,318,539
FEED GRINDER
Jonas J. Byberg, Silverton, Oreg. 97381
Filed May 3, 1965, Ser. No. 452,783
1 Claim. (Cl. 241—186)

The present invention, like that described in my copending application Ser. No. 348,536, filed Mar. 2, 1964, and bearing the same title, now United States Letters Patent 3,189,287, relates to means for mixing and grinding or comminuting certain types of feed for animals, and the present application is a continuation-in-part of application Ser. No. 348,536.

Both the present invention and the invention set forth in the above mentioned previously filed application relate to a feed mixer and grinder in which the grinding or comminuting of the feed material takes place near the top of a mixing tank and is performed by a pair of opposed co-axial discs located in horizontal planes, provided with special comminuting blades in a novel and particular arrangement, and with the device provided with means, such as a central rotating auger located in a conveyor tube, for delivering the feed material centrally between the pair of discs.

In the device specifically disclosed in the previous application Ser. No. 348,536, the lower disc of the pair, which is of greater diameter than the upper disc, is held stationary while the upper disc is rotated. The upper disc carries a continuous series of blades on its lower face adjacent its periphery and the stationary lower disc is provided with a continuous series of cooperating or so-called anvil blades positioned a short distance radially outwardly from the path of the blades of the upper disc.

While such arrangement of a stationary lower disc with an upper rotating disc has proved very satisfactory under most conditions and with many feed materials, nevertheless, under some conditions and with some materials certain problems have been encountered.

One of these problems has been due to the fact that the lower disc, in order to be held in stationary position, is supported by a plurality of hangers positioned beyond the blades of the stationary lower disc. When the materials to be ground and mixed are more or less moist it has been found that there is a tendency for some of the material to collect around these hangers, instead of falling away freely from the blades of the lower disc, and any amount of accumulation or any building up of such material reduces the efficiency of the device, and in rare instances may even necessitate the shutting down of the device from time to time in order to clear the collected material from the periphery of the stationary lower disc.

Another difficulty encountered with large mixing tanks, having the various parts made mainly from thin sheet material, is that the supporting of the lower disc in stationary position by means of hangers extending down from the top of the tank, and with the conveyor tube for the auger in turn supported from this lower disc, the vibration to which the lower disc is subjected, unless much heavier and less practical stationary support means are employed, makes it difficult for the two cooperating discs to be maintained constantly in proper alignment with each other, and such alignment is very necessary since the blades of the two discs have only a slight clearance respectively.

In order to overcome these particular difficulties in such cases, and also to enable variations in relative rotating speed of the pair of cooperating discs to be obtained through simple changes in the driving connections, further modifications have been developed in the grinding and feeding device as hereinafter briefly described with reference to the accompanying.

Figure 2:
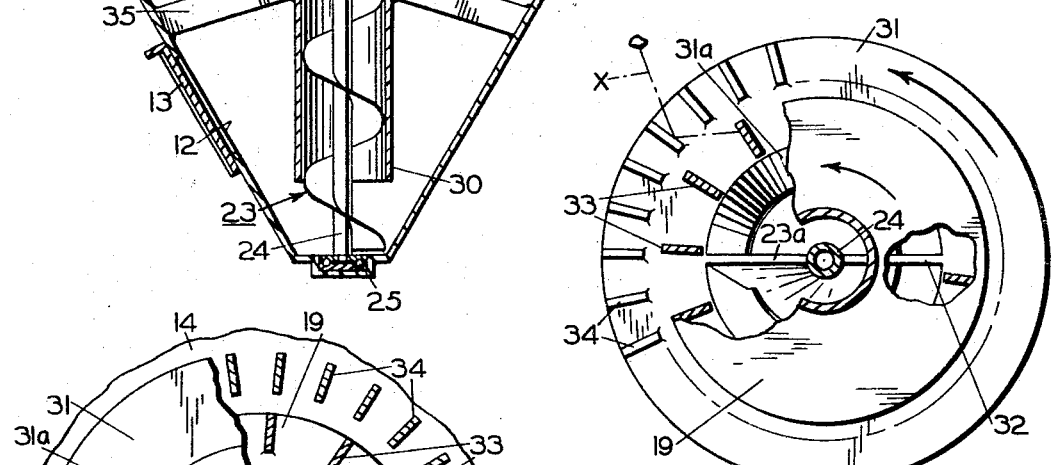
Figure 3:
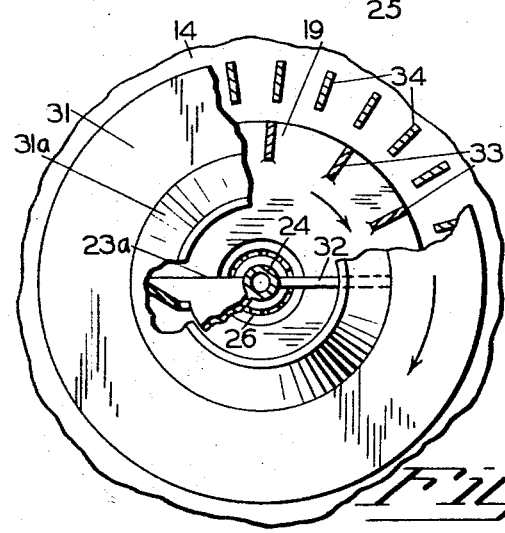

In the drawings:
FIGURE 1 is a sectional elevation showing a feed grinder embodying the present invention;
FIGURE 2 is a section on line 2—2 of FIGURE 1 drawn to a larger scale;
FIGURE 3 is a section on line 3—3 of FIGURE 1 drawn to the same scale as FIGURE 2.

Referring first to FIGURE 1, the device includes a tank 10 of standard or suitable size and shape for holding the grain to be ground. The tank is provided with suitable support means (not shown), and with a suitable inlet 11 at or near the top, and suitable discharge outlet 12 with a control slide or shutter 13.

The top wall 14 of the tank is formed with a central cylindrical bearing housing 15, in which are a pair of support bearing assemblies 16 and 17. These bearing assemblies rotatably support a tubular shaft 18 to the bottom end of which is secured an annular rotating disc 19. A belt pulley 20 is secured on the top end of the tubular shaft 18 above the bearing housing 15 and has suitable belt connections 21 with a drive pulley 22 secured on the shaft of the motor M, the motor being mounted on the side of the tank 10.

An auger designated in its entirety by the reference 23, includes an auger shaft 24 which extends upwardly from the bottom of the tank and through the tubular shaft 18 for the rotating disc 19, and terminates above the top of the tubular shaft 18. This auger shaft 24 is rotatably mounted in a suitable bearing 25 at the bottom of the tank 10 and in an upper bearing 26 located within the tubular shaft 18. A pulley 27, secured at the top of the auger shaft is connected by a belt 28 to a second drive pulley 29 on the shaft of the motor M. Thus, as apparent from FIGURE 1, the auger 23 and the rotating disc 19 are both driven from the motor M, but the rotating disc 19 is driven at much greater speed than the auger.

A stationary conveyor tube 30 surrounds the auger 23 for most of its extent, the open bottom of this conveyor being located a short distance above the bottom end of the auger. The conveyor tube 30 is supported in vertical central or axial position within the tank by suitable bracket arms 35 and 36 extending inwardly from the side of the tank.

A lower annular rotating disc 31 is carried by the auger 23 and thus is co-axial with the rotating disc 19 and is located in a horizontal plane parallel to the plane of the disc 19. The annular disc 31 has a downwardly and inwardly extending flange 31a which terminates in a bottom rim having approximately the same diameter as the conveyor tube 30 and which is spaced a slight clearance distance above the top end of the stationary conveyor tube 30. The top end of the auger blade is widened and secured at its outer edge to the flange 31a so as to provide one of the supports for the annular disc 31, and an oppositely extending radial arm 32, carried on the auger shaft, also rigidly connects the annular disc 31 with the auger.

Thus, as illustarted in FIGURE 1 the lower annular disc 31, rotating with the auger, is rotated in the same direction as the upper rotating disc 19 but at much slower speed. By varying the driving connections for the pulley 20 it would of course be possible to change the relative rotational speed of the upper disc 19 with respect to the speed of the lower disc 31 and auger, and also, by interposing additional pulleys or gears, it would be possible to have the upper disc 19 rotate in a direction opposite to that of the lower disc 31 and auger. However, the arrangement as illustrated in FIGURE 1, with both discs rotating in the same direction and with the lower disc rotating in relatively slow speed in comparison with the speed of the upper disc 19 is regarded as the preferred arrangement.

A series of identical, equally spaced and substantially radially-extending impeller blades 33 are mounted on the underside or bottom face of the upper rotating disc 19 adjacent the outer periphery (see also FIGURES 2 and 3). These are flat rectangular blades extending in vertical planes with their bottom edges spaced only a slight distance above the top face of the underlying annular disc 31 for clearance.

A series of similar identical, equally spaced flat anvil blades 34 are mounted on the top face of the lower annular disc 31 adjacent its periphery. These blades 34 are spaced outwardly from the periphery of the upper disc 19, and thus are spaced from the outer edges of the impeller blades 33 of the upper disc a sufficient distance (for example from ¼-inch to 1-inch or so) so that no cutting or crushing of the feed grains between these two sets of blades occurs. The anvil blades 34 on the lower disc are preferably taller than the impeller blades 33 of the upper disc and preferably are spaced closer together, as indicated in FIGURES 2 and 3.

As the grain or feed is carried up onto the inner portion of the lower annular disc 31 by the operation of the auger 23 it is contacted by the impeller blades 33 of the rapidly rotating upper disc 19. These impeller blades 33 act to cause each grain particle to be thrown outwardly in a direction for the most part which will be tangent to the periphery of the upper rotating disc 19 at the point where the particle leaves the upper disc. Upon leaving the upper disc the particle will strike the surface of an outer anvil blade 34 and in turn be deflected outwardly, as indicated by the broken line X in FIGURE 2.

The impact of the grain particles as they strike the outer anvil blades 34 results in the shattering or breaking up of the particles. Due to the fact that the larger particles will strike the outer anvil blades with greater inertial effect the shattering effect produced on the larger size heavier particles will be greater than with the smaller particles, which, with the recirculation of the grain through the device, will tend largely to equalize the grind or comminuting of the particles and make it uniform. It will also be apparent that, since there is no simultaneous contact of the blades of the two sets with each particle, excessive grinding of some of the particles is not likely to occur, and the production of undesirable "flour" as incidental to the grinding is greatly minimized.

It will be noted that the corners and edges of the blades play little part in the grinding action and that the particles strike the flat faces of the outer anvil blades to receive their shattering impacts. Consequently no sharpening of any edges or corners of the blades is required, and as long as the particles are thrust outwardly against the flat faces or broad sides of the outer anvil blades the grinder maintains its efficiency. Furthermore, as each particle strikes an anvil blade it will be deflected outwardly, subsequently dropping back down into the tank. Consequently the individual particles do not interfere with each other or do not get in the path of the on-coming particles, and there is no cushioning effect to reduce the effectiveness of the grinding as occurs, for example, in grinders of the hammer mill type. Also there is no accumulation of material on the outer periphery of the lower disc 31.

Although a tank of a particular shape has been shown in FIGURE 1, and although a familiar type of vertical, centrally positioned auger assembly has been shown as the means for delivering the grain to the grinding means, various shapes of tanks may be used for the feed being ground, and also other means for bringing or delivering the feed to the impeller or velocity imparting blades 33 could be employed without departing from the principle of the invention.

I claim:

A feed grinder including a tank, a rotating auger in said tank, a conveyor tube surrounding said auger, a pair of co-axial discs spaced a short distance apart in parallel horizontal planes and located near the top of the tank co-axial with the auger and conveyor tube, the lower of said discs being an annular disc having a central opening, means securing said lower disc to the auger shaft, the auger and conveyor tube leading to said lower disc, means rotatably supporting the upper of said discs, means for imparting rotation to said upper disc, said lower disc having a greater peripheral diameter than said upper disc, a series of equally spaced impeller blades mounted on the lower face of said upper disc, said blades positoned adjacent the periphery of said upper disc, the edges of said blades adjacent said lower disc terminating within a short clearance distance from said lower disc, and a series of equally spaced substantially rectangular anvil blades mounted on the upper face of said lower disc and positioned adjacent the outer periphery of said lower disc, the inner edges of said anvil blades on said lower disc being spaced from the respective outer edges of said impeller blades on said upper disc by a distance of not less than ¼-inch.

References Cited by the Examiner

UNITED STATES PATENTS

| | | | |
|---|---|---|---|
| 2,919,864 | 1/1960 | Parmele | 241—253 |
| 3,189,287 | 6/1965 | Byberg | 241—275 |

ROBERT C. RIORDON, *Primary Examiner.*

D. G. KELLY, *Assistant Examiner.*